284829 0002 --00 06-18-91 47524

05-14-91 123020 78147.0 01033613 0003

United States Patent [19]

Bodnar

[11] E

Patent Number: Re. 33,613

[45] Reissued Date of Patent: Jun. 18, 1991

[54] ROTARY APPARATUS

[76] Inventor: Ernest R. Bodnar, 2 Danrose Crescent, Toronto, Ontario M3B 3N5, Canada

[21] Appl. No.: 402,658

[22] Filed: Sep. 5, 1989

Related U.S. Patent Documents

Reissue of:

[64] Patent No.: 4,732,028
Issued: Mar. 22, 1988
Appl. No.: 938,406
Filed: Dec. 5, 1986

U.S. Applications:

[63] Continuation-in-part of Ser. No. 811,442, Dec. 20, 1985, abandoned, which is a continuation-in-part of Ser. No. 598,978, Apr. 11, 1984, abandoned.

[51] Int. Cl.[5] ..... B21D 37/12
[52] U.S. Cl. ..... 72/190; 83/337
[58] Field of Search ..... 72/186, 190, 191, 196; 83/337

[56] References Cited

U.S. PATENT DOCUMENTS

| | | |
|---|---|---|
| 804,512 | 11/1905 | Witt . |
| 1,333,704 | 3/1920 | Buschmeyer . |
| 1,581,236 | 4/1926 | Speer . |
| 2,951,410 | 9/1960 | Brown . |
| 3,066,542 | 12/1962 | Einhiple . |
| 3,123,905 | 3/1964 | Thomas . |
| 3,137,922 | 6/1964 | Schumacher . |
| 3,205,744 | 9/1965 | Huck . |
| 3,209,791 | 10/1965 | Boots . |
| 3,239,912 | 3/1966 | Baumgartner et al. . |
| 3,274,873 | 9/1966 | Sauer . |
| 3,367,161 | 2/1968 | Avakian . |
| 3,382,695 | 5/1968 | Cape . |
| 3,394,573 | 7/1968 | Bodnar . |
| 3,405,580 | 10/1968 | Hallden . |
| 3,438,835 | 4/1969 | Chen et al. . |
| 3,673,834 | 7/1972 | Bruner et al. . |
| 3,709,077 | 1/1973 | Trogan et al. . |
| 3,828,636 | 8/1974 | Smith . |
| 3,850,780 | 11/1974 | Crawford et al. . |
| 4,052,873 | 10/1977 | Murzin et al. . |
| 4,059,000 | 11/1977 | Bodnar . |

FOREIGN PATENT DOCUMENTS

| | | |
|---|---|---|
| 837660 | 6/1960 | United Kingdom . |
| 1456530 | 11/1976 | United Kingdom . |

*Primary Examiner*—Lowell A. Larson

[57] ABSTRACT

A rotary [cutting and] forming apparatus for strip material, [having] *has* rotatable upper and lower roll units, the units being connected for synchronous rotation, each of the units having a carrier member with at least one recess extending parallel to its central axis, and at least one die support block, the block being rotatably received within the recess, and having two ends, and a surface to which a die may be affixed, leading and trailing control pins on the block, extending on parallel spaced apart axes, and leading and trailing cam surfaces engaging respective leading and trailing control pins, to control the position of the blocks during at least *that* part of their rotation *when the dies engage the workpiece so that the forming planes of such dies are parallel to the workpiece during such engagement and immediately prior to and subsequent to such engagement.*

17 Claims, 9 Drawing Sheets

ROTARY APPARATUS

Matter enclosed in heavy brackets [ ] appears in the 'iginal patent but forms no part of this reissue specifica- on; matter printed in italics indicates the additions made y reissue.

*This application is a continuation-in-part of application er. No. 811,442, Rotary Die Apparatus, filed Dec. 20, 985, now abandoned and which in turn was a continua- on-in-part of application Ser. No. 598,978, Rotary Die pparatus, filed April 11, 1984 and now abandoned.*

NATURE OF THE INVENTION

This invention relates to a rotary [cutting and] rming apparatus for high speed continuous punching, rming or shearing of sheet metal. [This application is continuation-in-part of application Ser. No. 811,442, otary Die Apparatus, filed Dec. 20, 1985 and now andoned.]

BACKGROUND OF THE INVENTION

Conventional sheet metal cutting and forming de- ces are reciprocating presses. Material to be worked is aced within a press, positioned stationary over a die. e press, usually mechanically operated, is closed, us forcing a second die into contact with the work- ece. The force exerted on the workpiece by the dies ll deform the piece or punch holes in the piece as quired. When the operation is complete, the press ens, the workpiece is removed and a new workpiece serted. Because of the reciprocating motion inherent such devices, the speed with which they may work is nited. Two solutions have been used. In one system e strip material is moved intermittently, step-wise rough the press. In another system a so-called flying ear or die is used with a strip moving continuously. In is system the die is accelerated to the speed of the strip d the press closes, while the die and strip are moving unison. The die then opens, and returns to its starting sition. Typically, the punching, forming or shearing a continuous material, such as sheet metal, is limited a line speed of about 250 feet per minute.

However, a roll forming line without a punching, rming or shearing device could handle strip metal at eeds up to about 1,000 feet per minute.

It is evident that the output of an assembly or manu- cturing line is only as fast as the slowest element in the e. In theory, a rotary press could be operated at much gher line speeds than a flying shear or die, and thus d to considerable economies in operation.

Existing rotary material-working devices may suffer m various disadvantages. Some may be limited to ecific operations such as cutting (see U.S. Pat. Nos. 51,410, 3,273,873, 3,438,835, 3,709,077 and 28,636); perforating (see U.S. Pat. No. 3,205,744); bossing (see U.S. Pat. Nos. 804,512 and 4,059,000, d U.K. Pat. Nos. 837,660 and 1,456,530); crimping e U.S. Pat. Nos. 3,123,905 and 3,367,161); and stretch rming (see U.S. Pat. No. 3,394,573).

Such devices are generally designed to perform a ecific one of the above operations and may not be able perform other operations. In particular, they are able to meet all the requirements for a full range of forming operations, or for shearing a strip already med into a complex section.

In such existing rotary machines shearing is feasible on flat, unformed strip. Die forming was achieved by using specially designed dies sometimes formed around an arc, which severely restricted the shape that could be formed. Generally it was not possible to use conventional flat dies as used in conventional reciprocating presses. Dies formed around an arc or radius, such as in U.S. Pat. No. 3,394,573, posed considerable problems. The function of a curved die as it contacts the workpiece is different from that of a flat die. The curved die will commence working the material on one side of the die. As the curved die rotates, deformation of the workpiece will proceed along the workpiece until the operation is complete. This often resulted in distortion. In a flat die as found in conventional die presses, the workpiece is cut or worked simultaneously across the die. In certain applications, such differences between standard and rotary devices may not be desirable.

Another approach to the problem is shown in U.S. Pat. Nos. 1,333,704, 1,581,236 and 3,066,542. In these patents the dies rotate around a circular orbit. In U.S. Pat. No. 1,581,236, the individual dies are guided and controlled by an annular cam track, and cam followers riding in the track. In this arrangement the dies are difficult to control. The cam followers cannot make a perfect fit in the annular track. Some clearance is needed in order that the followers can roll in the track. As a result, the dies are never held securely. When they meet they may fail to register perfectly, and damage may result.

With a view to overcoming these problems, the invention provides for a high speed rotary [cutting and] forming apparatus which makes use of flat dies and permits the accuracy of conventional die presses.

BRIEF SUMMARY OF THE INVENTION

The invention provides a rotary [cutting and] forming apparatus *for forming strip material having a major plane and* for use in association with [material forming] *material-forming ep* dies [for the forming strip material, comprising], *which dies have strip material-engaging forming planes and which apparatus comprises* a rotatable upper roll unit and a corresponding rotatable lower roll unit, the units being connected for synchronous rotation *through rotary cycles,* each of said units comprising a rotatable carrier member defining a central axis, and a *generally* semi-cylindrical recess, and at least one die support block adapted to be [swingably] *rotatably* mounted *in said recess* on said [corner] *carrier* member, and defining two ends and a *platen* surface to which a said die may be affixed *for movement with said block through a position in which a said forming plane of said die is generally parallel to said major plane of such strip material,* [and guide] *leading control* pin means extending from [each of the] *a leading portion of a* said [two ends, said roll units being spaced apart] *end of each said die support block along a first axis parallel to said central axis, trailing control pin means extending from a trailing portion of a said end of each said die support block along a second axis parallel to but spaced apart from said first axis of said leading control pin means, said upper and lower roll units being spaced apart* whereby said *strip* material may pass therebetween for [formation] *deformation* by said *forming* dies, [path definition] *upper and lower leading cam surface* means [adapted to receive said guide pins and guide] *positioned to engage said leading pin means of respective* said die support blocks *and having predetermined leading cam*

*profiles, upper and lower trailing cam surface means positioned to engage said trailing pin means of respective said die support blocks, and having predetermined cam profiles different from said leading cam profiles, whereby to support said die support blocks* during *at least* a *first* portion of [the] *each said* rotary cycle whereby [a die] *said upper and lower leading cam surfaces and said upper and lower trailing cam surfaces have such configurations that dies* affixed to said die support [member] *blocks* on said upper [unit] and [a die affixed to said die support member on said] lower [unit] *units* [may] register with each other [and cooperate together] *and are disposed with their strip material-engaging planes mutually parallel and parallel to the strip material during engagement with the strip material* for [the] deformation of [the] *that* material *and immediately prior to and immediately after such engagement,* and [retaining] *bearing* means [whereby] *for supporting* said [die support block is retained on said carrier member] *upper and lower units.*

The advantages of the invention include the following: the device can be operated continuously or intermittently at high speed, thus allowing a manufacturing line, in which the device may be a component, to operate at high line speed. The device is as accurate as conventional, reciprocating die presses. Use of a flat die set allows standard die tool-making procedures to be used. The device may have as much flexibility in its use, for forming holes, indentations and the like in a workpiece, as has a conventional die press.

Accordingly, it is an objective of the invention to provide a rotary apparatus for cutting or forming strip sheet material at high speed.

It is a further objective of the invention to provide such a rotary apparatus incorporating a flat die.

It is a further objective of the invention to provide such a rotary apparatus which may operate with at least the accuracy of conventional die presses.

It is a further objective of the invention to provide such a rotary apparatus wherein the die blocks include additional guide means, interengaging between respective die blocks on upper and lower units, and further controlling the position of said die blocks as they close and open relative to said workpiece.

It is a further objective of the invention to provide such a rotary apparatus in which means may be provided for controlled intermittent operation whereby portions of the workpiece may pass through the rotary apparatus without being formed or cut.

The various feature of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

*FIG. 7 is an exploded view of a detail of the embodiment of FIG. 6;*

Figure 6:
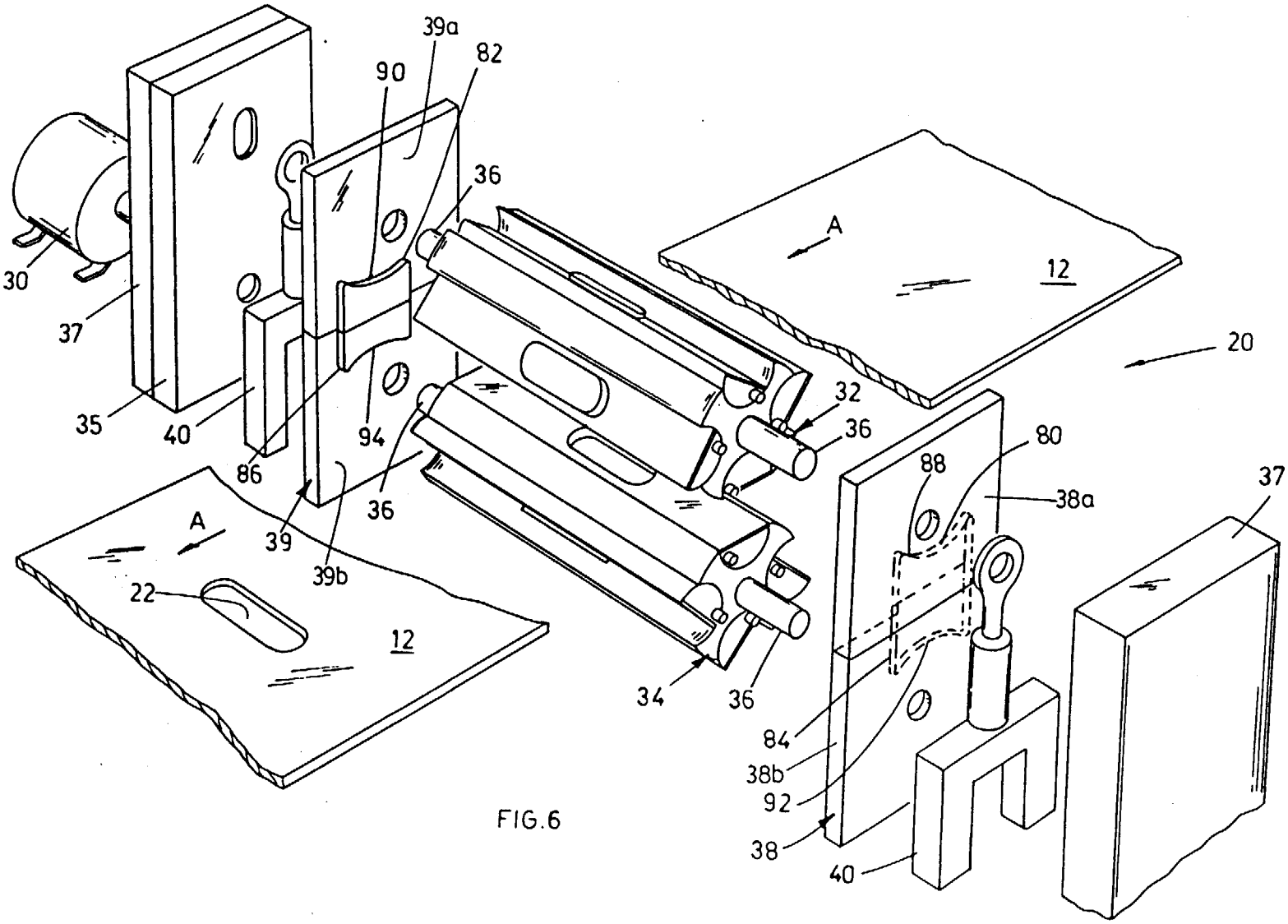
FIG. 6 is a view correponding to FIG. 2 but of an alternate embodiment.
Figure 8:
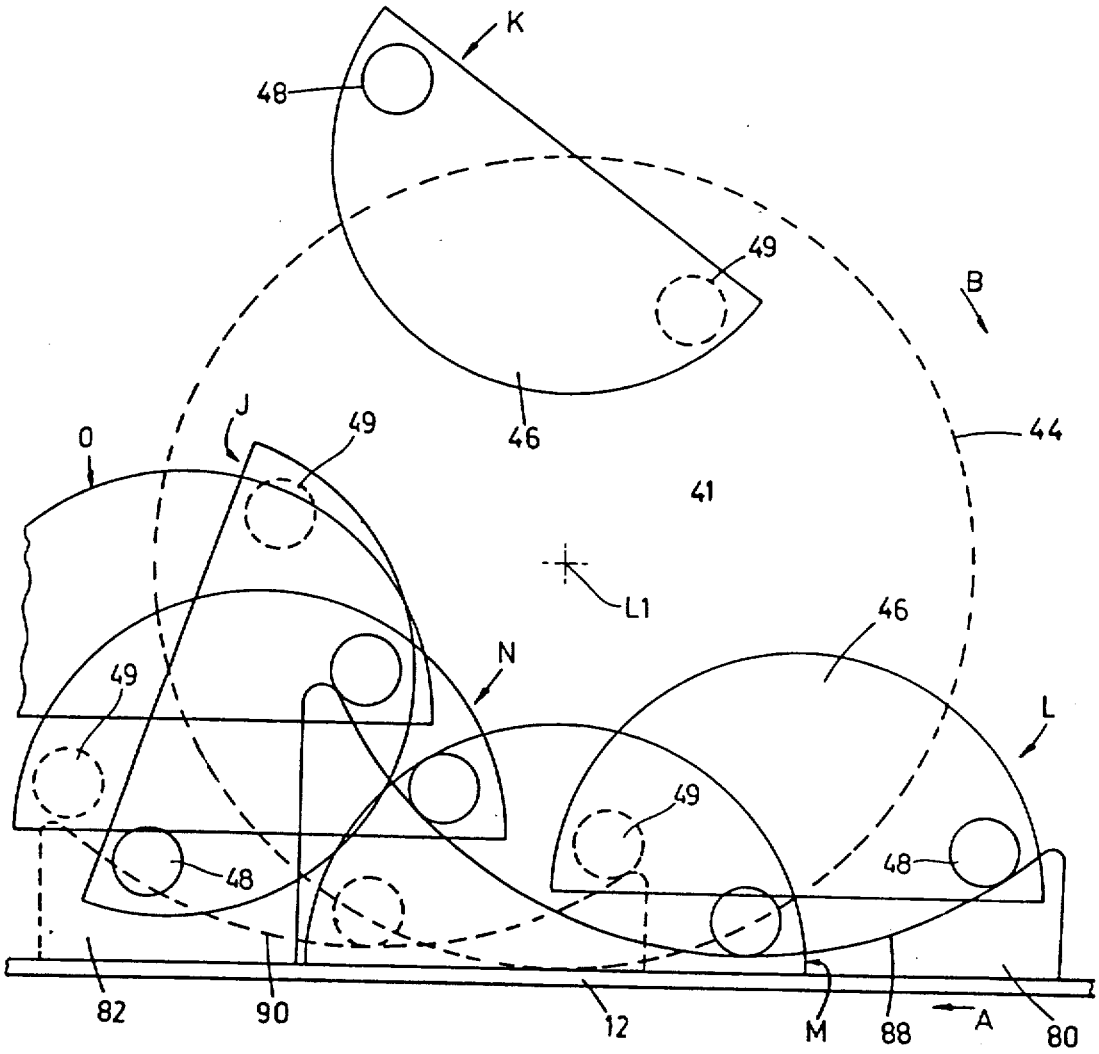
Figure 9:
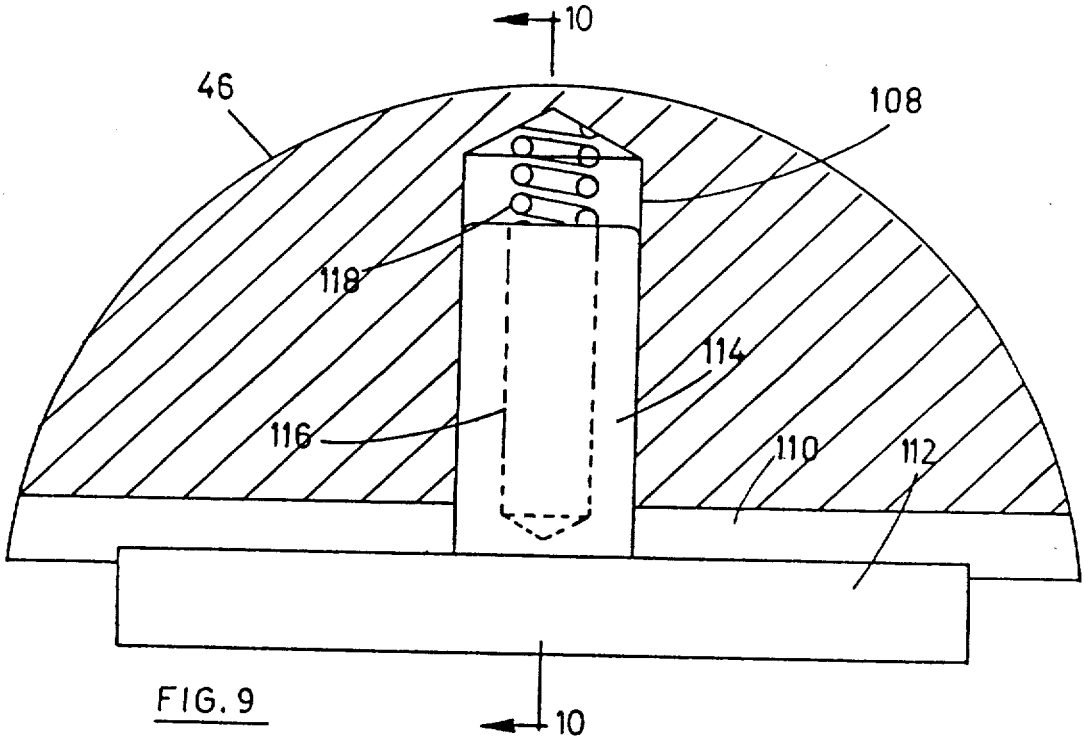

FIG. 8 [represents] *is* a cross-sectional view [along line 8—8 of FIG. 6,] illustrating the operation of the embodiment of FIG. 6;

[FIG. 9 is an exploded view of a detail of the embodiment of FIG. 6;]

FIG. [10] *9* is a sectional side elevation of [an ultimate] *yet another* embodiment;

FIG. [11] *10* is a section along the line [11—11] *10—10* of FIG. [10] *9;*

FIG. [12] *11* is a schematic top plan view of an alternate embodiment of the rotary apparatus for intermittent operation; and FIG. [13] *12* is a section along the line [13—13] *12—12* of FIG. [12] *11.*

DESCRIPTION OF AN EMBODIMENT OF THE INVENTION

Figure 1:
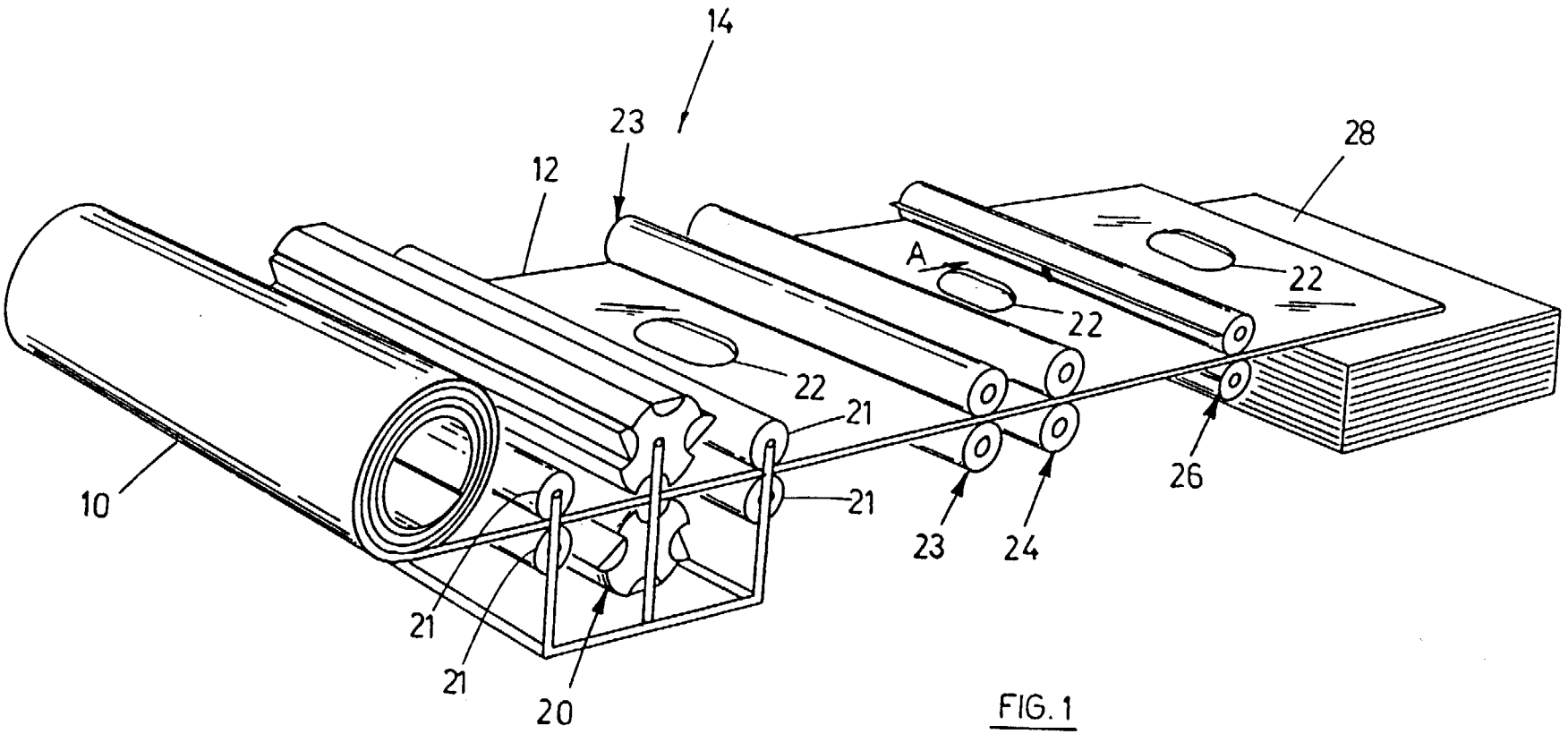
FIG. 1 is a schematic illustration in perspective of a manufacturing line incorporating a rotary apparatus according to the invention.

Referring to FIG. 1, there is illustrated a roll 10 of strip sheet material 12 upon which it is desired to perform various forming operations. Material 12 may often be sheet metal. Such operations may typically be performed in a manufacturing line 14. Material 12 is unwound from roll 10 and passed continuously along line 14, in the direction indicated by arrow A. The various forming operations are performed on material 12 as it passes different points along line 14. As material 12 is unwound from roll 10, typical first operations may be die forming operations, performed by a rotary apparatus 20 according to the invention. Apparatus 20 may punch holes *22*, or form complex indentations [22,] or both, in material 12 as it passes through apparatus 20. Nip rollers 21, both above and below material 12, guide material 12 through rotary apparatus 20. Subsequent operations may typically include roll-forming operations at station 23. Further operations as desired may be carried out at station 24. The final operation is typically the cutting of material 12 in cutting station 26 into standard lengths 28 convenient for further manufacturing or assembly processes and for storage.

Futher nip rollers (not shown) may be used to guide material 12 through stations 23, 24 and 26. Of course, any number of stations 20, 23, 24 and 26 may be used in sequence, as desired.

The above description of a typical manufacturing line is provided herein in order to facilitate the description of the invention. The description of the manufacturing line is not intended to limit the invention in any way. Rather the apparatus according to the invention may be used in any manufacturing line or in any situation requiring high speed, continuous, accurate die forming of strip material.

Figure 2:
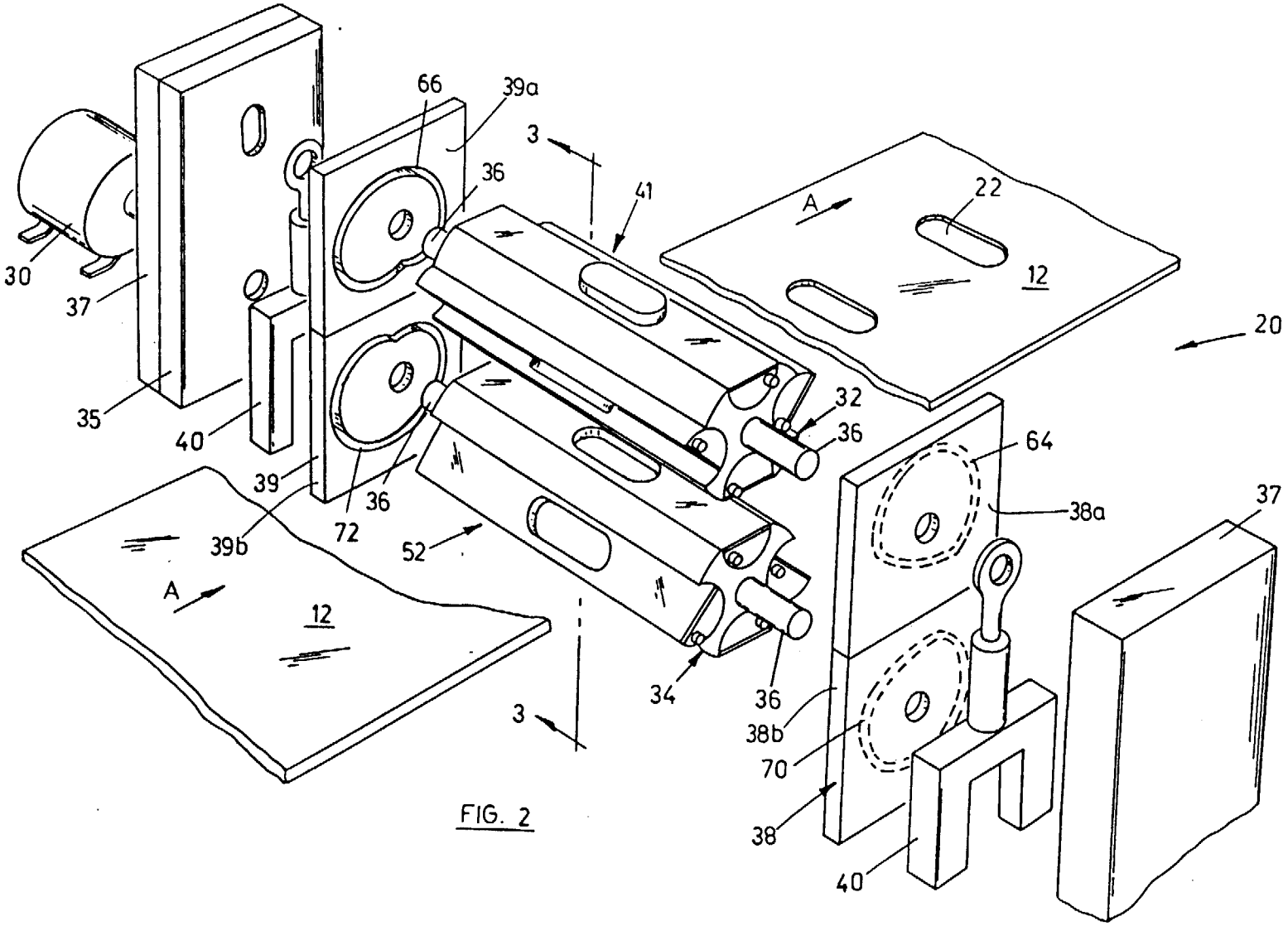
FIG. 2 is an exploded schematic drawing in perspective of a rotary apparatus according to the invention.

Referring to FIG. 2, there is schematically illustrated a rotary apparatus 20 according to the invention. Motor 30 drives upper roll unit 32 in unison with and, at the same speed, as lower roll unit 34 through transmission 35 and shafts 36. Material 12 passes between and is contacted by upper and lower units 32 and 34. Upper and lower units 32 and 34 may be supported by suitable ıearing means 37. In this embodiment motor 30 and ransmission 35 are such as to provide the outer surfaces ıf upper and lower units 32 and 34 at the point of :ontact with material 12 with essentially the same speed .s material 12, so that there is no slippage or relative notion between the material 12 and either or both of ıpper unit 32 and lower unit 34.

However in an alternate embodiment described be-ow, relative motion is provided for.

Transmission 35 and bearings 37 may be adjustable to 'ary the maximum distance between upper and lower ınits 32 and 34 in order to accommodate sheet material 2 of varying thicknesses or to increase the pressure pplied to material 12. Hydraulic pistons 40 may be ttached to shafts 36 so that upper unit 32 may be uickly removed from contact with material 12. Such apability allows the apparatus 20 to leave linear por-ions of material 12 unformed, if desired.

Motor 30, transmission 35, bearings 37 and pistons 40 ıay all be standard components as are well-known in he machine tooling industry.

Figure 3:
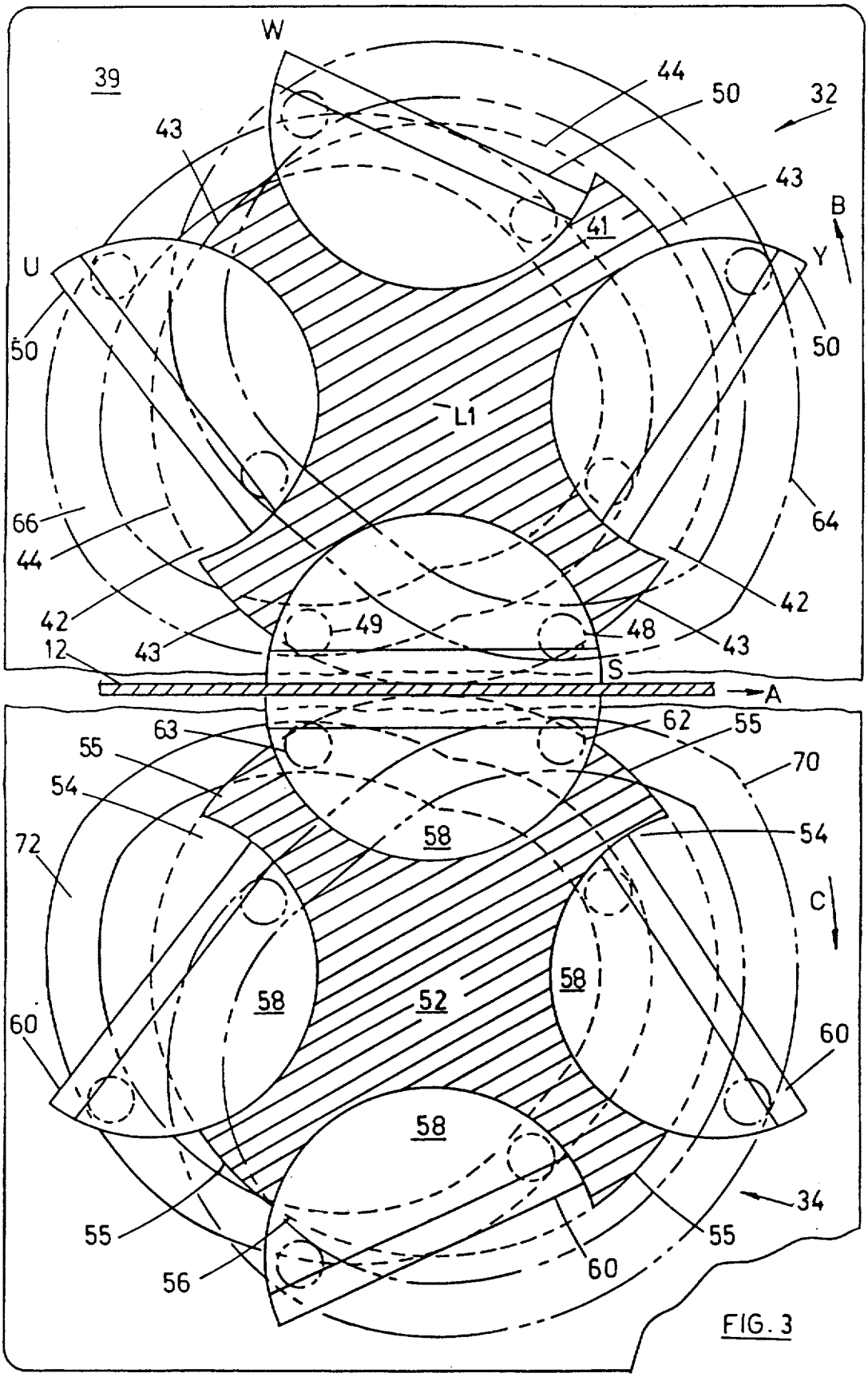
FIG. 3 is a cross-section along the line 3—3 of FIG. 2 *with certain other parts shown in phantom outline;*

FIG. 3 illustrates in cross-section upper die unit 32 nd lower die unit 34 in position to die form sheet mate-ıal 12. Upper unit 32 rotates counter-clockwise in the irection indicated by arrow B. [Lower unit 34 ro-ıtes.] Lower unit 34 rotates clockwise in the direction ıdicated by arrow C. Material 12 moves from left to ght in the direction indicated by arrow A.

It will be appreciated that the designations "upper", lower", "left", "right", "clockwise", and "counter-lockwise" are for convenience of description only and :e not intended to limit the invention, which will oper-:e equally effectively in any direction or orientation. imilarly, references to an "upper die" located in a :rtain position and to a corresponding "lower die" in a :rtain corresponding position are not intended to limit ıe invention. Two dies operate as a pair and the indi-idual location of each is irrelevant to the invention so ›ng as the pair operates together at the required loca-on and time. *End plates 38 and 39 are provided at oppo-te ends of the rotary apparatus 20 for a purpose yet to be :plained.*

Figure 4:
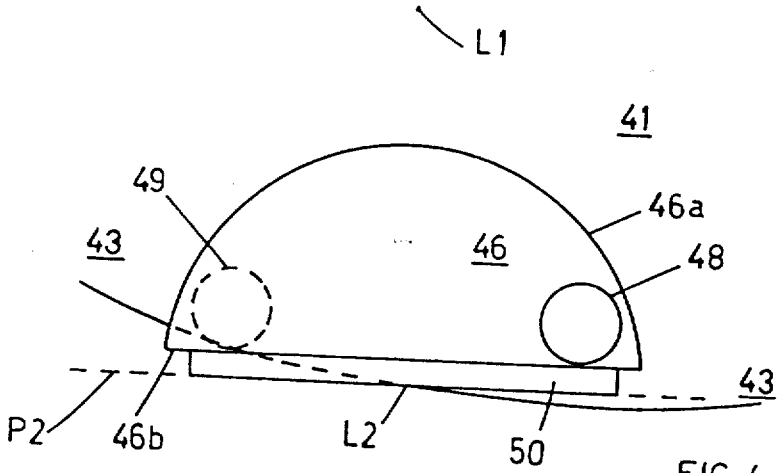
FIG. 4 is a detail view in cross-section of a portion of the rotary apparatus of the invention.

Upper unit 32 is essentially identical to lower unit 34. eferring to FIGS. 3 and 4, upper unit 32 includes pper carrier member 41, which defines a longitudinal ·is L1 about which upper unit 32 rotates. Member 41 :fines at least one (in the illustrated embodiment, there 'e four) generally semi-circular cylindrical recesses on] *or* [opening] *openings* 42, defining central axes *2* (FIG. [5] *4*) extending longitudinally parallel to ıe axis L1 of member [42] *41*. Member 41 further :fines abutments 43 between openings 42. The outer surface] *surfaces* of abutments 43 define a notional rcular cylindrical surface 44 (shown in cross-section ; phantom circle 44). The axes L2 of *generally semi-ylindrical* openings 42 may lie on notional surface 44 arallel to axis L1. However in an alternate embodi-ent described below this is modified.

Referring to FIG. [5] *5*, upper die support blocks 46 'e retained within openings 42 by the *generally* semi-rcular retaining flanges 47. Each block 46 is *generally emi-cylindrical in shape having a cross-section that is gment-shaped—namely, that shape bounded between the 'rimeter of a circle and a chord of the circle. Thus block 5 defines two surface portions: a generally* semi-cylindri-l portion 46a and a planar portion 46b. [Semi] *Gen-ally semi*-cylindrical portion 46a is fitted within open-g 42, so that block 46 is freely rotatable within its asociated opening 42. [As described below, a first] *First or leading* guide pin means 48 [extending] *extend* from one end of blocks 46 and [a] second *or trailing* guide pin means 49 [extending] *extend* from the [outer] *other* end *of* guide blocks 46 [as they rotate into position], so that *the generally* semi-cylindrical surface portions 46a remain in contact with the surfaces of recesses [on] *or* openings 42 and the planar portions 46b are located in the desired position *as the blocks 46 rotate.* On a block 46, *guide* pin means 48 and 49 define and lie on different axes for reasons described below.

Upper dies 50 are mounted on planar portions 46b of blocks 46 in any conventional manner. The die surface of a die 50 defines a forming plane P2 (FIG. [5] *4*). Die 50 is mounted on block 46 so that the plane P2 is essentially parallel to the planar portion 46b of block 46 and so that the plane P2 includes the axis *L2* of opening 42, in this embodiment. Lower unit 34 comprises lower carrier member 52, defining *generally* semi-cylindrical openings 54, abutments 55 and [semi-] *generally* cylindrical surface 56, lower support blocks 58, and flat lower dies 60. [Guide] *Leading and trailing guide* pin means 62 and 63 *respectively* are and flat lower dies 60. Guide pin means 62 and 63 are provided in a fashion offset at opposite ends of the block similar to the equivalent components of upper unit 32. Retaining flanges 47 are also provided.

Each of pins 48, 49, 62 and 63 defines a cam follower means (not shown) at its free end. Pins 48 are guided by cam means such as a cam groove 64 defined in [fixed] end plate 38, at one end. Pins 49 are guided by cam means such as cam groove 66 in [fixed] end plate 39, at the opposite end.

Similarly, on lower unit 34, guide pins 62 and 63 are guided by corresponding cam means; e.g., cam grooves 70 and 72, respectively, on [fixed] end plates 38 and 39, at opposite ends. *It is to be noted that all of the grooves 64, 66, 70 and 72 are shown in FIG. 3 to facilitate understanding of the invention.*

[Fixed end] *End* plate 38 is divided between grooves 64 and 70 into upper and lower end plates, 38a and 38b respectively. Similarly, end plate 39 is split between grooves 66 and 72 into upper and lower end plates, 39a and 39b. Both end plates 38a and 39a are fixed by suitable means (not shown) relative to the axis L1 of upper unit 32. Such suitable means may, for example, comprise a guide track, preventing the rotation of plates 38a and 39a relative to axis L1, and a bearing means for shaft 36 in plates 38a and 39a.

Similarly, end plates 38b and 39b are fixed relative to the axis [L1] of lower unit 34.

The provision of split end plates 38a, 38b, 39a and 39b, fixed as described above, allows the distance between upper unit 32 and lower unit 34 to be varied as desired without interfering with the operation of die forming apparatus 20. As hydraulic cylinders 40 are operated, such distance between units 32 and 34 varies. Upper end plates 38a and 39a move up and down in unison with upper unit 32, yet cam grooves 64 and 66 continue to support pins 48 and 49.

Cam grooves 64 and 66 are shaped and pins 48 and 49 are positioned relative to blocks 46 whereby the forming planes P2 of dies 50 are essentially parallel to material 12 immediately prior to, during and subsequent to closing. Similarly, cam grooves 70 and 72 are shaped, and pins 62 and 63 are positioned relative to blocks 58 whereby the forming planes [P2] of dies 60 are essentially parallel to material 12 immediately prior to, during and subsequent to closing.

Because a block 46 and a block 58 [may] *is* each [be] supported by two pins on different axes the blocks are less prone to rock or otherwise move within their fittings than are those found in standard rotary forming devices. Thus, in comparison to previously used rotary devices, the clearances required by the cam follower mechanism do not have as great an effect on the accuracy of the forming operation. In fact, the double cam construction of the invention results in substantially improved forming accuracy, and thus, longer useful die life.

Figure 5:
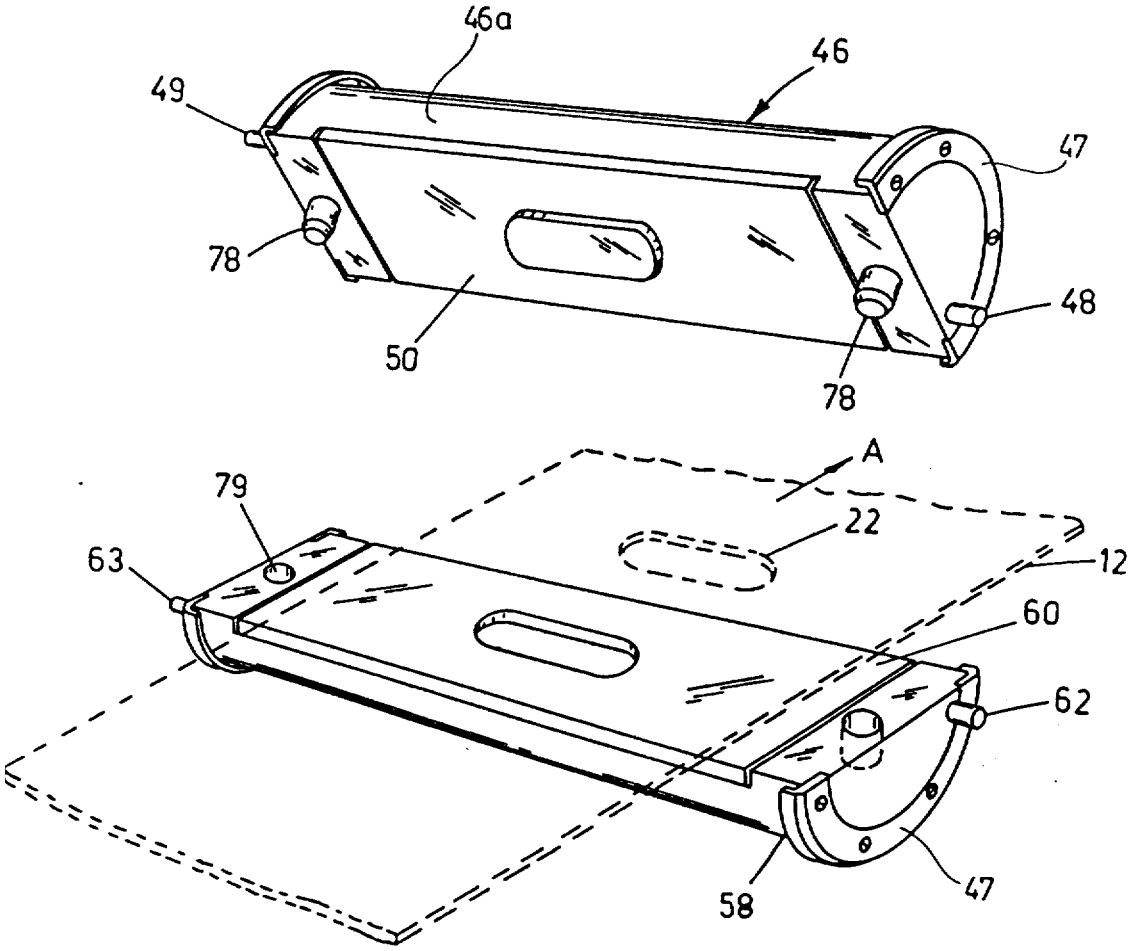
FIG. 5 is a detail view in perspective of a portion of the rotary apparatus according to the invention [about to contact the workpiece]

To further ensure accuracy, upper support block 46 may be provided with locating dowels 78 on either side of die 50 (see FIG. 5). Lower support block 58 may be provided with corresponding dowel receiving bores 79 on either side of die 60. Dowels 78 and bores 79 are shaped, sized and located on either side of strip material 12 so that they may cooperate and register with each other without interference with material 12. As upper and lower units 32 and 34 rotate, dowels 78 extend toward and are partially inserted into bores 79 prior to contact with material 12. As a die 50 and a die 60 come into contact with material 12, the dowels 78 are fully inserted into the [bore] *bores* 79, thus ensuring that die 50 and die 60 contact material 12 in proper registration with each other. Although accuracy is ensured by the use of dowels 78 and bores 79, such dowels 78 and bores 79 may not always be necessary for the accurate functioning of the device according to the invention. The device as described above has been found to operate with satisfactory accuracy with such dowels and bores.

Referring to FIG. 3, in operation, upper and lower units 32 and 34 rotate. Each die 50 rotates through the successive illustrated positions of upper unit 32. Such positions have been labelled in FIG. 3 as positions S, U, W, and Y. The closed position of apparatus 20, which is the position at which material 12 is formed, is defined as position S. Position S is treated as defining the starting point of the rotary cycle. Rotation continues, counterclockwise as indicated by direction arrow B, through each of the other positions [U] *Y*, W and [Y] *U* and returns to starting position S. Similarly, each die 60 rotates through the illustrated positions of lower unit 34. The movement of any die 60 is the mirror image of the movement of its corresponding die 50. It will, of course, be appreciated that all dies rotate simultaneously and, at any particular time, are at different positions in the rotary cycle.

At position S material 12 is formed by die 50 and die 60. As rotation continues to position [U] *Y*, die 50 and die 60 are separated from material 12. Because pins 48, 49, 62 and 63 follow their respective cam grooves 64, 66, 70 [or] *and* 72, die 50 and die 60 initially remain essentially parallel to each other and to material 12. Abutments 43 and 55 come into contact with material 12. Thus, if there has been any adhesion between material 12 and either die 50 or die 60, material 12 will be pushed away from such dies 50 or 60 and will continue to pass smoothly through rotary apparatus 20.

As rotation continues, the cam followers cause block 46 to rotate through the positions [U] *Y*, W and Y] *U*. Following position [Y] *U*, dies 50 and 60 are brought into essentially parallel position for the forming operation at position S.

In an alternate embodiment, cam grooves defined in the fixed end plates 38 and 39 are not necessary. Instead the cam followers of pins 48, 49, 62 and 63 may be constrained to follow curved ramps during certain predetermined positions in the rotary cycle. Referring to FIG. 6, ramp 80 is affixed to [fixed] end plate 38a and ramp 82 to [fixed] end plate 39a. Similarly associated with lower unit 34, ramps 84 and 86 are also affixed to [fixed] end plates 38b and 39b, respectively. Ramps 80, 82, 84 and 86 define curved surfaces 88, 90, 92 and 94, respectively.

Surfaces 88, 90, 92 and 94 are shaped whereby the forming planes P2 of dies 50 and 60 are essentially parallel to material 12 and to each other immediately prior to, during and subsequent to closing. During other parts of the rotary cycle, the precise positioning of blocks 46 and 58 relative to members 41 and 52, respectively, [are] *is* unimportant as long as blocks 46 and 58 may again be brought parallel prior to closing.

Consequently, when the cam followers are not in contact with ramps 80, 82, 84 and 86, blocks 46 and 58 may be biased into a suitable fixed position by an appropriate biasing means. One such possible biasing means is illustrated in FIG. [9] *7*. Block 46 defines a circumferential channel 96. Member [40] *41* has a post 98, adapted to fit within channel 96 so that block 46 may still orbit within opening 42. Spring 100 is fitted within channel 96 and attached at one end to a wall of channel 96 (or to a post inserted in channel 96) and at the other end to post 98. In such a configuration, spring 100 tends to hold block 46 in the position indicated as J or K in FIG. 8 relative to member 41. In this position, pin 48 is extended radially away from axis L1 whereby it may come into contact with its respective ramp 80 at a predetermined position in the rotary cycle.

Figure 7:
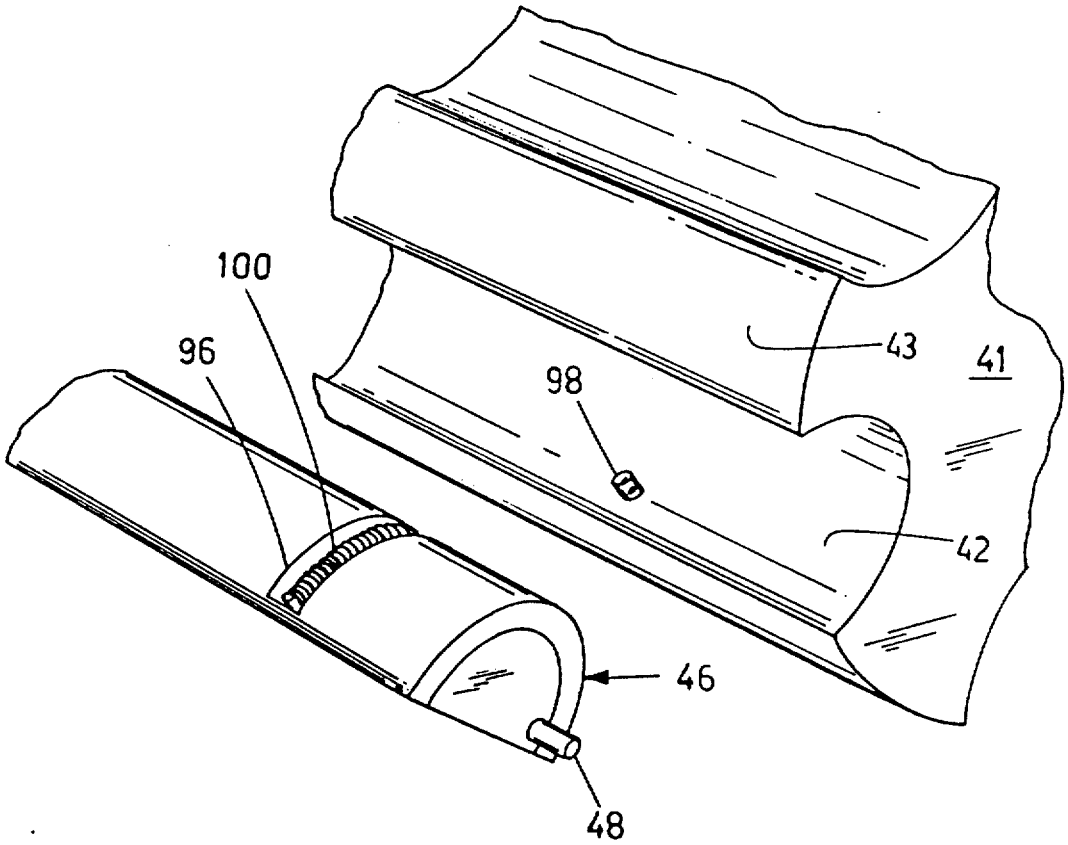
[FIG. 7 is a cross-section similar to that of FIG. 3, but illustrating the embodiment of FIG. 6 in a different position;]

The operation of this embodiment is best understood by referring to [FIGS. 7 and] *FIG.* 8. [FIG. 7 illustrates upper and lower units 32 and 34 in a position immediately after one pair of dies 50 and 60 have closed and immediately before a second pair of dies 50 and 60 have closed.] FIG. 8 illustrates one block 46 in member 41 shown at various positions in the rotary cycle. Successive positions are indicated by the lables J, K, [H] *L*, M, N and O. One ramp 80 and it associated pin 48 are drawn in sold line. The other ramp 82 and its associated pin 49 are shown in phantom.

While only one block 46 is illustrated, it will be appreciated that other blocks 46 attached to member 41 will travel through corresponding positions of the rotary cycle at different times. It will be further appreciated that while only upper unit 32 is illustrated, similar action is occurring in lower unit 34.

Commencing arbitrarily with position J in the rotary cycle, spring 100 holds block 46 so that pin 48 is extended away from the axis L1 of member 41. As rotation occurs block 46 passes through position K to position [H] *L*. There is no relative motion between block 46 and member 41 from position J to position [H] *L*. At position [H] *L*, the forming plane P2 (FIG. [5] *4*) of die 50 is essentially parallel to material 12.

At position [H] *L*, pin 48 contacts the surface 88 of ramp 80. Also, pin 49 contacts the surface 90 of ramp 82. As rotation continues block 46 now commences to orbit within opening 44. Spring 100 commences to stretch. Pin 48 moves along surface 88. Pin 49 moves along surface 90. Such motion continues to position M. The surfaces 88 and 90 are shaped to ensure that plane P2 remains parallel to material 12.

On lower unit 34 (not shown in FIG. 8) a correspond-ng plane [P2] of die 60 is also essentially parallel to naterial 12 and thus to the plane P2 of die 50.

As rotation continues to position M, relative rotation ›etween block 46 and member 41 continues and spring .00 stretches further. At about position M plane P2 :ontacts material 12 and, in cooperation with die 60, the naterial 12 is deformed as required.

After dies 50 and 60 have thus closed, rotation contin-ıes. Pins 48 and 49 remain in contact with respective amps 80 and 82. Plane P2 remains parallel to material 2. Relative rotation between block 46 and member 41 ontinues and spring 100 stretches further.

At about position N, pin 49 is removed from ramp 82.

At about position O, pin 48 reaches the end of ramp 0. Spring 100, which has been urging block 46 to rotate [clockwises] *clockwise*, may now act to return block 6 to its initial position with respect to member 41, for xample, as shown at position J.

Suitable limit means (not shown) allow spring 100 to old block 46 within opening 42 during rotation from osition J to position L. For example, the presence of an ɔutment means (not shown) extending into opening 42 'om member 41 would allow spring 100 to hold block 5 securely against the abutment. Block 46 would thus ɜ prevented from moving out of opening 42 under the ıfluence of centrifugal force as unit 32 rotates.

Because, in this embodiment, block 46 is pressed into lace against the ramps by the rotation of member 41 rior to closing, a solid and accurate punch is possible. pring 100 operates to keep pins 48 and 49 in contact ith their respective ramps 80 and 82, thus further ısuring punching accuracy.

In other embodiments, it may be possible to use [a ımp] *ramps* or cam [groove] *grooves* on only one de of a die unit in conjunction with such a spring 'ging a die support block into contact with such ramp] *ramps* or [groove] *grooves*. It may also be ɔssible to use a ramp on one side of a die unit and a cam 'oove on the other side of the same unit. Use of a asing spring may be avoided in such an embodiment.

It will be appreciated that a die apparatus according the invention may be used in any situation requiring e use of high speed, accurate cutting or forming. part from the standard hole punching or indentation rming operation described above, the apparatus of the vention may, for instance, be used with a shearing die cut roll formed strip material with a complex, shaped lge.

Several die units may be placed in line for forming ›mplicated holes or shapes. For instance, a first rotary ›paratus may punch a hole. A second rotary apparatus ay form shapes around the hole. A third rotary appa-tus may perform further operations and so on as re-ıired. Such operation would be very similar to the ›eration of existing progressive die presses.

The apparatus of the invention may be used to leave ıformed areas at spaced intervals along the strip mate-ıl. The upper and lower die units 32 and 34 are simply parated so that they do not contact material 12 over ch intervals.

In accordance with a further embodiment of the in-ntion as shown in FIGS. [10] *9* and [11] *10*, provi-›n may be made for still further stabilizing the die pport blocks 46 and 58, so that they are forced to opt precisely parallel [plane] *planes* prior to the gagement of the two dies [on the blocks] *with the rkpiece.*

It will of course be appreciated that if the two die 10 support blocks are not precisely parallel, and parallel with the workpiece, prior to the engagement of the dies on the workpiece, the workpiece will not be formed precisely, and conceivably damage may result to the dies themselves.

In the embodiment shown in FIGS. 1 to [9] *8*, the pins 78 and openings 79 will normally provide a suffi-cient degree of guidance to ensure that the two blocks are precisely parallel to one another before the dies close.

However, since some degree of wear is inevitable, it is considered desirable to make provision for a still greater degree of guidance.

Accordingly, as shown in FIGS. [10] *9* and [11] *10*, the upper die block 46 is shown with a die guidance pin 78 received in a bore 102, and being retained therein by any suitable means (not shown).

A die block guide channel 104 is machined in either end of the block 46, so as to replace the function of the retaining flanges 47.

This feature [111] would also be used in the *lower* block 58 in this embodiment.

In order to further assist in guiding and controlling the blocks 46 and 58, a further guide bore 108 is formed in, for example, the upper die block 46, parallel to the bore 102.

Bore 108 communicates with a longitudinal channel 110 of generally rectangular shape, extending from side to side of the block 46 transverse to its longitudinal axis.

Each of the *upper and lower* die blocks 46 and 58 *respectively* [may] *will generally* be provided with two such guidance bores 108, one at each end, and two such channels 110. *It will be understood that the channels 110 are located transversely outwardly of the path of the strip material.*

Figure 10:
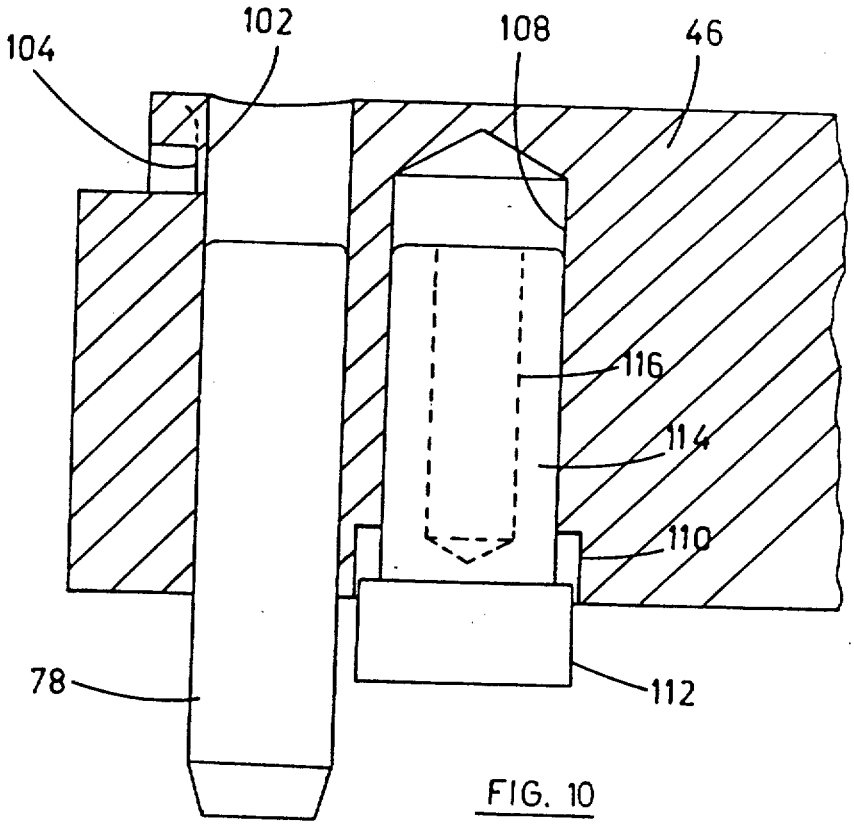
Figure 11:
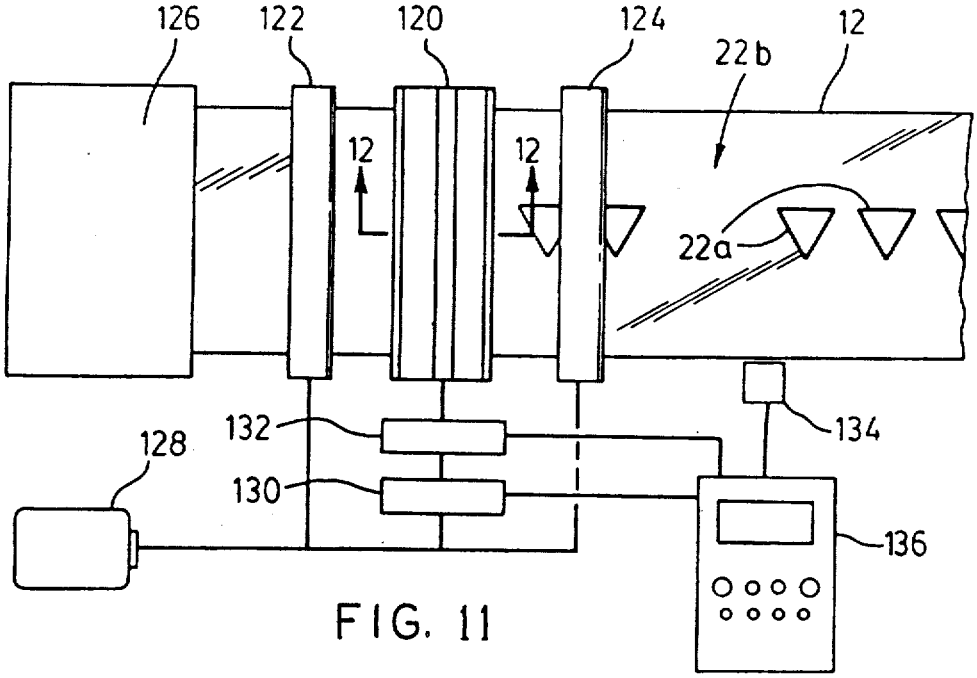
Figure 12:
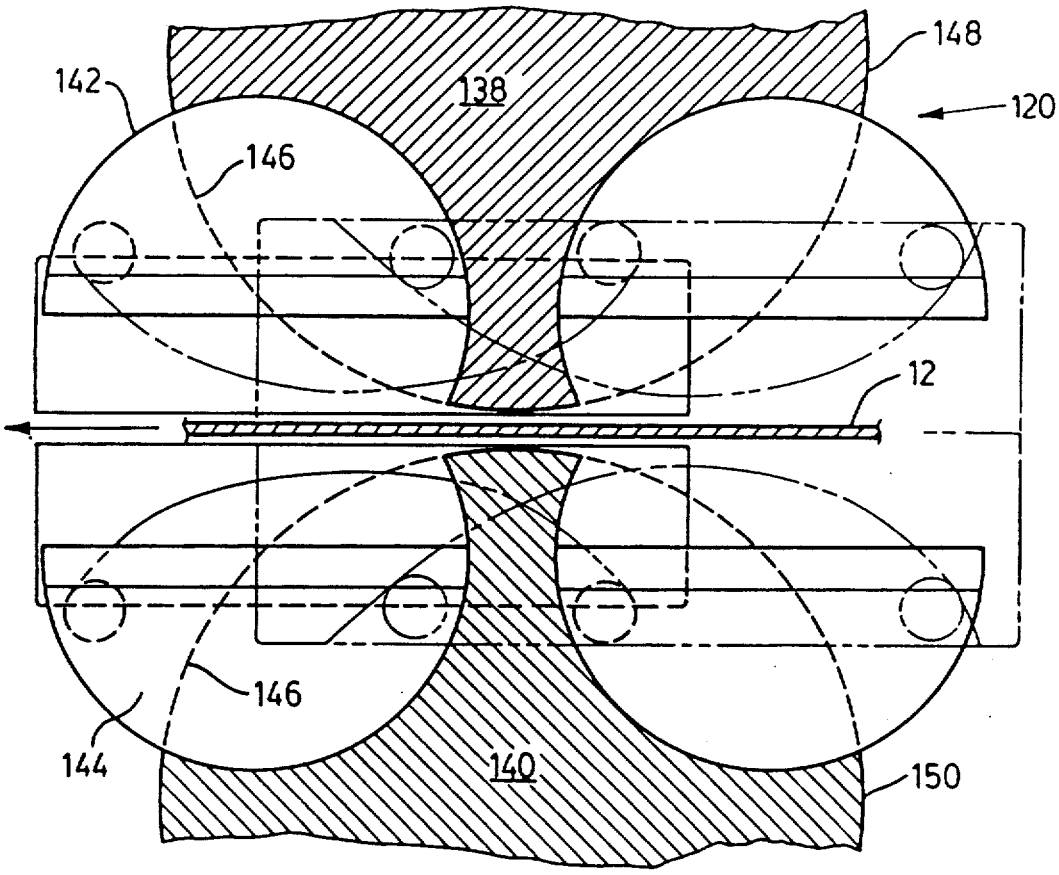

An elongated rectangular contact bar 112 is received in channel 110, and is mounted on a cylindrical guide shaft 114 extending into guide bore 108. A counter-bore 116 is formed in shaft 114, and receives a spring 118 (*omitted from FIG. 10*) therein. The spring 118 will preferably be a heavy duty compression spring.

Any suitable retaining means (not shown) will be provided for retaining the shaft 114 in the bore 108.

The four bars 112 on the upper and lower die mem-bers [26] *46* and 58 register with one another in pairs, as the dies are closing, but prior to contact with the workpiece.

[The] *On contact of the bars 112 with each other, the* heavy duty springs 118 will yield and allow the bars 112 to move inwardly into the channels 110, but 55 will, at the same time, force the faces of the bars 112 firmly into contact with one another along their length.

This function will thus ensure that the blocks 46 and 58 are located in parallel space-apart planes parallel to the workpiece prior to contact of the dies with the workpiece, thus ensuring accurate repetitive forming of the workpiece, without damage to the dies.

It will be appreciated that in the form illustrated both the upper and lower die blocks 46 and 58 are provided with the same guidance bars 112 and shafts 116.

The purpose of this is to reduce the distance of travel of each of the guide bars 112, and yet ensure that they meet and contact one another at a point early enough in the closing of the dies, that they can achieve a secure and accurate guidance function before the die is closed.

It will, of course, be appreciated however that where dies of a different nature are in use, such that a lesser degree of travel would be acceptable, it may be permissible to provide such guidance bars 112 on only the upper or the lower of the two die blocks. If only one pair of such guidance bars 112 were used then, of course, the guidance bars would simply contact the face of the other block and provide the same guidance function as described above.

It will be appreciated, therefor, that while this embodiment of the invention is illustrated as provided on both upper and lower die blocks and at each end, some degree of guidance function and security will be achieved by providing only one pair of such guidance bars. Conceivably also some limited degree of guidance can be achieved merely by the provision of one of such guidance bars at one end of one block.

The invention is not, therefore, limited to any specific number of such guidance bars.

In accordance with a further embodiment of the invention as illustrated in FIGS. [12] *11* and [13] *12*, provision may be made for intermittent operation of the rotary apparatus.

Intermittent operations may be desirable where it is intended to produce from the strip sheet material, an end product which is cut to a predetermined length. Thus, for example, if it is desired to produce sheet metal strip having a series of formations, along predetermined lengths of the strip, and intermittent discontinuities in the formations, then, as has been described above, one solution would be to simply move one of the roll units away from the other.

Another solution to the problem is, however, to simply stop the upper and lower units momentarily and allow the strip sheet [mayterial] *material* to pass between them, without being formed or punched, for a predetermined length.

As shown schematically in FIG. [12] *11*, a typical strip sheet material line for functioning in this way would comprise a rotary cutting or forming apparatus 120, upstream and downstream pinch rolls 122 an 124, and an uncoiler 126. The strip sheet material is indicated as 12, and in this embodiment is shown simply as being formed with generally triangular perforations or openings [12a] *22a*. A discontinuity indicated generally as [12b] *22b* indicated between two of the perforations [12a] *22a*.

In this embodiment the rotary apparatus 120 is driven by means of a motor 1128, driving through a clutch 130. Clutch 130 drives the rotary apparatus 120, and the drive is controlled by means of a brake 132.

A line speed indicator 134 may be used if desired, for contacting the strip sheet material 12. However this information can equally well be obtained in other ways, and it is illustrated here merely for the sake of clarity.

A central data processing unit 136 provided with typical controls and displays is connected to the line speed indicator 134, and to the clutch 130 and to the brake 132.

It may also be connected to all of the rolls, and to the motor 128 if desired for capturing further information.

Referring now to FIG. [13] *12*, the rotary apparatus 120 is essentially similar to that described in the preceding description. Accordingly the various features are described in only general terms herein, where they are the same. Thus the rotary apparatus 120 comprises carrier members 138 and 140 having die support blocks 142 and 144, guided and controlled in the manner described above.

The [central axis] *rotational axes* of the die blocks 142 and 144 move around [a] circular [path indicated in phantoms as 146] *paths.*

However, the surface portions 148 and 150 of the carrier members 138 and 140 lie on the [perimeter] *perimeters* of [a circle] *circles 146* of [a] somewhat smaller [radius than the circle 146] *radii.*

In this way, when the two carrier members 138 and 140 are in the position illustrated in FIG. [13] *12*, the surfaces 148 and 150 are out of contact with the workpiece 12.

The workpiece is held in any event between the pinch rolls 122 and 124, and is therefore at all times controlled.

By suitably programming the processor 136 to operate the clutch 130 and brake 132 in the correct time sequence, it is possible to stop the upper and lower carrier members 1348 and 140 in the position shown in FIG. [13] *12*, for a predetermined dwell time, sufficient to allow an unformed portion [12b] *22b* of the workpiece 12 to pass between them.

The processor 136 will then again signal the brake 132 to release and the clutch 130 to re-engage, and rotation of the carrier members 138 and 140 will be resumed.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A rotary [cutting and] forming apparatus for forming strip material *having a major plane and* for use in association with [material forming] *material-forming* dies [comprising], *which dies have strip material-engaging forming planes and which apparatus comprises:* a rotatable upper roll unit and a corresponding rotatable lower roll unit, said units being connected for synchronous rotation *through rotary cycles*, each of said units comprising a [corner] *carrier* defining a central axis, said member having at least one recess extending along said member parallel to the central axis, said recess having bearing surface means of generally [semi-circular] *semi-cylindrical* shape, and [at least one] *a* die support block, rotatably received within said recess, said block defining two ends and a [platan] *platen* surface to which [at least one of] *a* said forming [dies] *die* may be affixed *for movement with said block through a position in which a said forming plane of said die is generally parallel to said major plane of such strip material;* leading control pin means extending from a leading portion of a said end *of each said die support block* along a first axis *parallel to said central axis;* trailing control pins means extending from a trailing portion of a said end [.] *of each said die support block* along a second axis *parallel to and* spaced *apart* from said first axis of said leading control pin means;

said upper and lower roll units being spaced apart whereby said *strip* material may pass therebetween for [formation] *deformation* by said *forming* dies;

*upper and lower* leading cam surface means positioned to engage said leading pin means *of respective said die support blocks*, and having [a] predetermined leading cam [profile] *profiles;*

*upper and lower* trailing cam surface means positioned [to avoid said leading pin means, and] to engage

[only] said trailing pin means *of respective said die support blocks*, and having [a] predetermined trailing cam [profile] *profiles* different from said leading cam [profile] *profiles*, whereby to support said die support blocks during *at least a first* portion of [the] *each said* rotary cycle whereby [a die] *said upper and lower leading cam surfaces and said upper and lower trailing cam surfaces have such configurations that dies* affixed to said [block] *blocks* on said *upper and* lower [unit may] *units* register with each other [and cooperate together] *and are disposed with their strip material-engaging planes mutually parallel and parallel to the strip material during engagement with the strip material* for [the] deformation of [the] *that* material *and immediately prior to and immediately after such engagement*; and, bearing means for supporting said *upper and lower* units.

2. A rotary *forming* apparatus as claimed in claim 1 [wherein said], *which comprises drive means operatively* onnected *to said upper and lower roll units through* transmission *means* and [bearings] *said bearing means and* ı *which said transmission means and said bearing means* re adjustable to allow said *upper and lower roll* units to e spaced apart at different distances [and including ydraulic pistons, connected to one of said units and onnected to power and control means, whereby said pacing may be adjusted].

[3. A rotary apparatus as claimed in claim 1 wherein aid dies define a flat forming plane.]

4. A rotary *forming* apparatus as claimed in claim [3 herein said path definition means comprise] *1 and hich also comprises:* an upper end plate at each end of said [blocks] *upper roll unit and* fixed with respect to the central axis of said upper *roll* unit; *and* a lower end plate at each end of said [blocks] *lower roll unit and* fixed with respect to the central axis of said lower *roll* unit, *in which said upper leading cam surface means and said upper trailing cam surface means are provided on said upper end plates, and in which said lower leading cam surface means and said lower trailing cam surface means are provided on said lower end plates* [;

guide means associated with each said plate adapted to receive and guide said pins; and, wherein said first portion of the rotary cycle includes a position of contact with the material and a portion of the cycle prior to and subsequent to said position of contact].

5. A rotary *forming* apparatus as claimed in claim 4 herein each said [guide] *cam surface* means comrises a first cam groove *portion* [, defined] in *a* respecve said [plates, said first groove defining] *end plate nd having* a generally concave [groove] *configuration nd* adapted to receive and guide *respective ones of* said pins whereby said forming plane is essentially parallel said material] *leading and trailing control pin means* uring said first portion of [the] *each said* rotary cycle.

6. A rotary *forming* apparatus as claimed in claim 5 herein *each* said [guide] *cam surface* means includes second cam groove *portion* [, defined] in *a* respective aid [plates] *end plate* and connected to said first cam roove *portion*, said second *cam* groove *portion being* dapted to receive and guide *respective ones of* said pins] *leading and trailing control pin means* during [said] *a* second portion of [the] *each said* rotary cycle.

[7. A rotary apparatus as claimed in claim 6 wherein each said pin includes a cam follower means adapted to fit within the follow said first and second grooves in said end plates.]

8. A rotary *forming* apparatus as claimed in claim 6 wherein said [pins] *leading control pin means and said trailing control pin means are provided* on opposite ends of [a] *each* said *die support* block [define different pin axes].

9. A rotary *forming* apparatus as claimed in claim 4 wherein each said [guide] *cam surface* means comprises a ramp affixed to *a* respective said [plates, said ramp defining] *end plate and having* a generally concave surface adapted to receive and guide *respective one of* said [pins] *leading and trailing control pin means* [whereby said forming plane is essentially parallel to said material] during said first portion of [the] *each said rotary cycle.*

10. A rotary *forming* apparatus as claimed in claim 1 [wherein said corner member has a limiting abutment extending into said recess whereby the rotation of said block within said recess is limited in one direction, and said retaining means includes] *and which also comprises* spring means affixed between *each* said *die support* block and [said corner] *its associated carrier* member [, said spring means] *and* urging said *die support* block [against said limiting abutment] *in a predetermined direction.*

11. A rotary *forming* apparatus as claimed in claim 10 wherein *each* said *die support* block [defines] *comprises* a channel extending along a *peripheral* portion *thereof* [of the semi-circular circumference of the block] and wherein said [corner] *carrier* member [defines] *has* a post extending radially away from said central axis [, said post adapted to fit within] *of said carrier member and extending into* said channel,and wherein said spring means is affixed at one end to said *die support* block within said channel *therein* and at the other end to said post *on said carrier member.*

[12. A rotary apparatus as claimed in claim 9 wherein each said pin includes a cam follower means, said cam follower means adapted to contact said surface of said ramp.]

13. A rotary *forming* apparatus as claimed in claim 9 wherein said [pins] *leading control pin means and said trailing control pin means are provided* on opposite ends of [a] *each* said *die support* block [define different pin axes].

14. A rotary *forming* apparatus as claimed in claim 1 wherein each said *die support* block in one of said *upper and lower* units has at least one outwardly extending *locating* dowel and where each said *die support* block in the other of said *upper and lower* units has a corresponding [dowel receiving] *dowel-receiving* bore adapted to receive said dowel, said dowels and bores being located [to] *toward* at least one [side of said material] *end of said upper and lower units*, whereby said dowels are inserted within said bores during contact [by] *of* said dies with said *strip* material.

15. A rotary *forming* apparatus as claimed in claim 1 wherein said leading control pin means [is located at one said end of its said block,] and said trailing control pin means [is] *are* located on [the other said end] *opposite ends* of *each* said block.

16. A rotary *forming* apparatus as claimed in claim 1 wherein there is a plurality of said die *support* blocks in each *of* said [unit] *upper and lower units.*

17. A rotary *forming* apparatus as claimed in claim 1 including guidance bar means on each said *die support* block in at least one of said *upper and lower* units, said guidance bar means being extendable from each said block [to,] and being retractable into said block upon *the* closing *together* of [a] *an opposed* pair of said *die support* blocks *of said upper and lower units.*

18. A rotary *forming* apparatus as claimed in claim 17 wherein said [guide block] *guidance bar* means comprise elongated generally rectangular bars, [and] shaft means extending into said *die support* blocks from said [guide bar means] *rectangular bars*, and spring means [controlling movement of said shafts] *urging said rectangular bars outwardly relative to said die support blocks.*

[19. A rotary apparatus as claimed in claim 1 including retaining channel means formed in each end of each said block, and retaining flanges on said carrier members, received in said channel means.]

20. A rotary apparatus as claimed in claim 1 wherein said carrier member has a surface adjacent said at least one recess, said surface being so formed as to be out of contact with said strip material at all times.

21. A rotary *forming* apparatus as claimed in claim [1] *20* including drive motor means, clutch means driven by said drive motor means, brake means connected to said rotary apparatus, for stopping same, and control means for operating said clutch means and brake means in timed relation, whereby said rotary apparatus may be started and stopped intermittently *while said strip material continues to pass therethrough.*

* * * * *